No. 659,729. Patented Oct. 16, 1900.
H. F. EATON.
CONTROL APPARATUS FOR ELECTRIC CARRIAGES.
(Application filed Mar. 25, 1899.)

(No Model.) 5 Sheets—Sheet 1.

Witnesses.
Paul Askenasy
Edward W. Stone

Inventor.
Howard F. Eaton.

No. 659,729. Patented Oct. 16, 1900.
H. F. EATON.
CONTROL APPARATUS FOR ELECTRIC CARRIAGES.
(Application filed Mar. 25, 1899.)
(No Model.) 5 Sheets—Sheet 2.
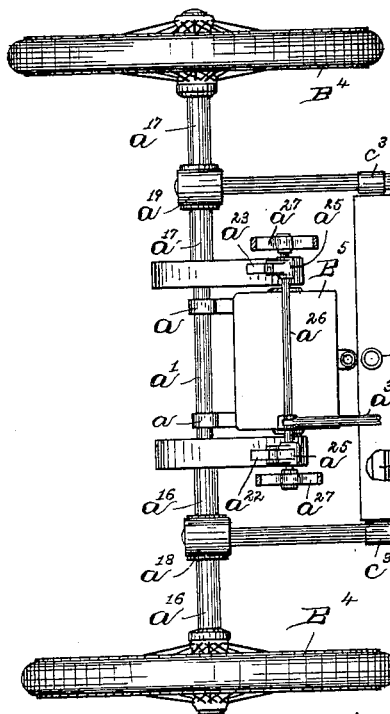
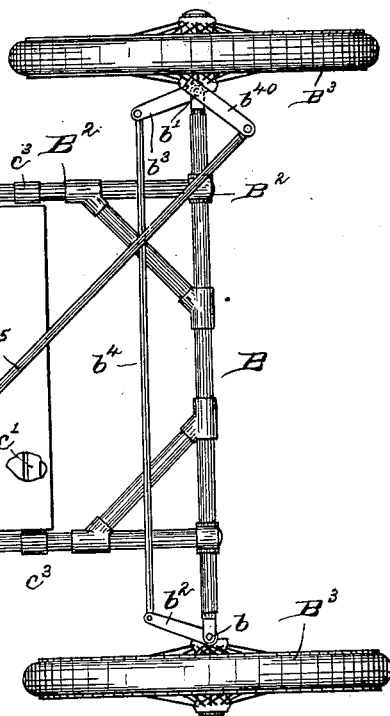
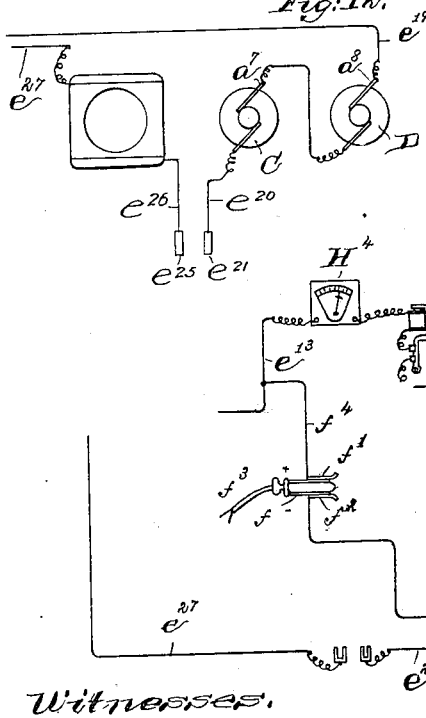
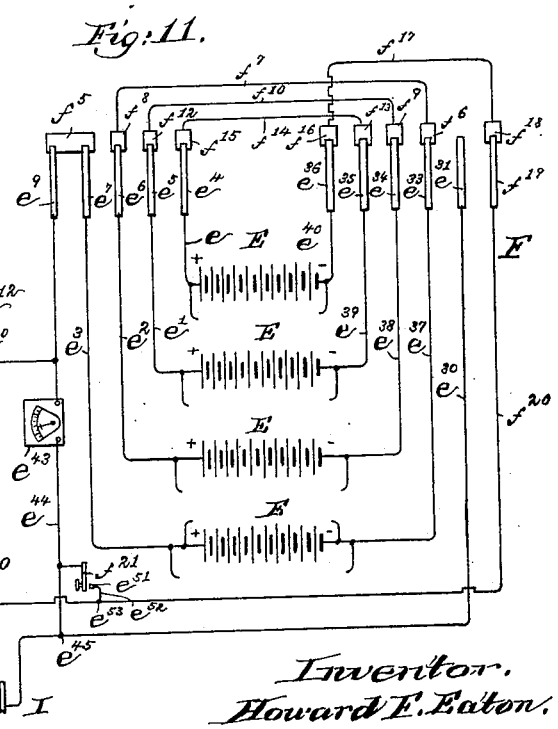
Witnesses:
Paul Askenasy
Edward W. Stnu
Inventor.
Howard F. Eaton.

No. 659,729. Patented Oct. 16, 1900.
H. F. EATON.
CONTROL APPARATUS FOR ELECTRIC CARRIAGES.
(Application filed Mar. 25, 1899.)
(No Model.) 5 Sheets—Sheet 3.
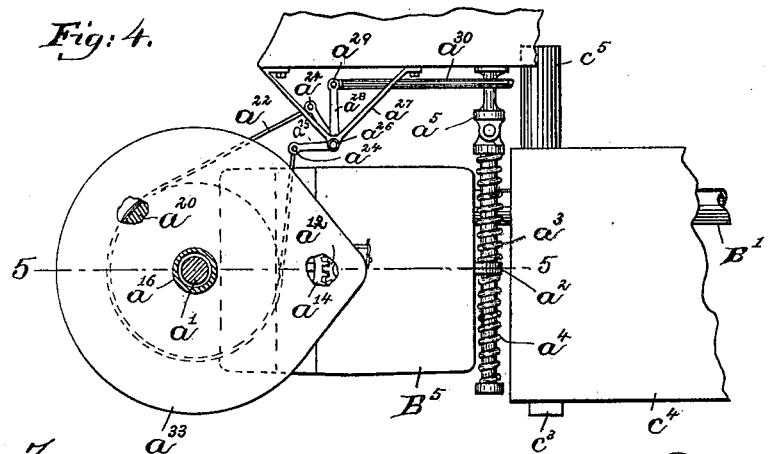
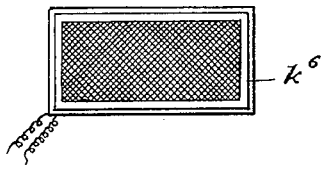
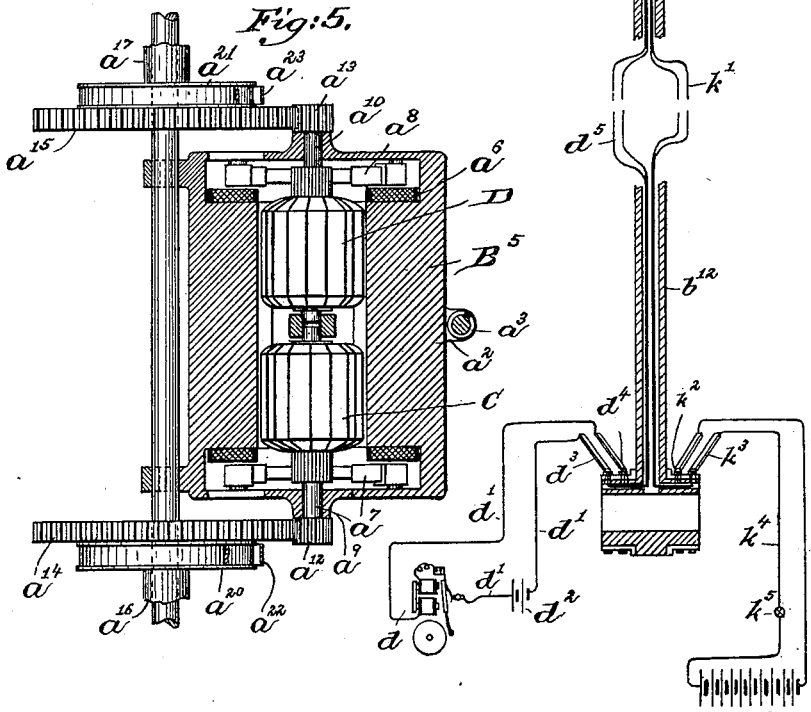
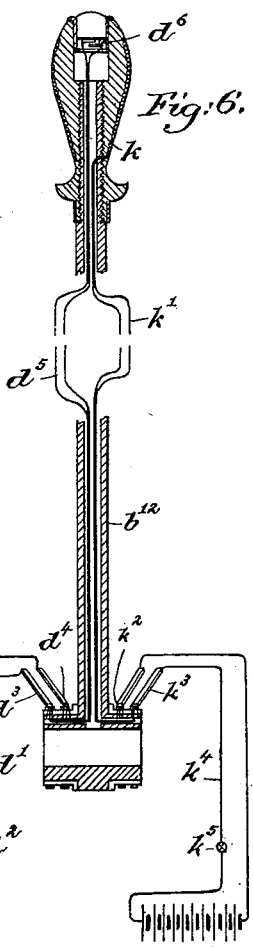

No. 659,729. Patented Oct. 16, 1900.
H. F. EATON.
CONTROL APPARATUS FOR ELECTRIC CARRIAGES.
(Application filed Mar. 25, 1899.)
(No Model.) 5 Sheets—Sheet 4.
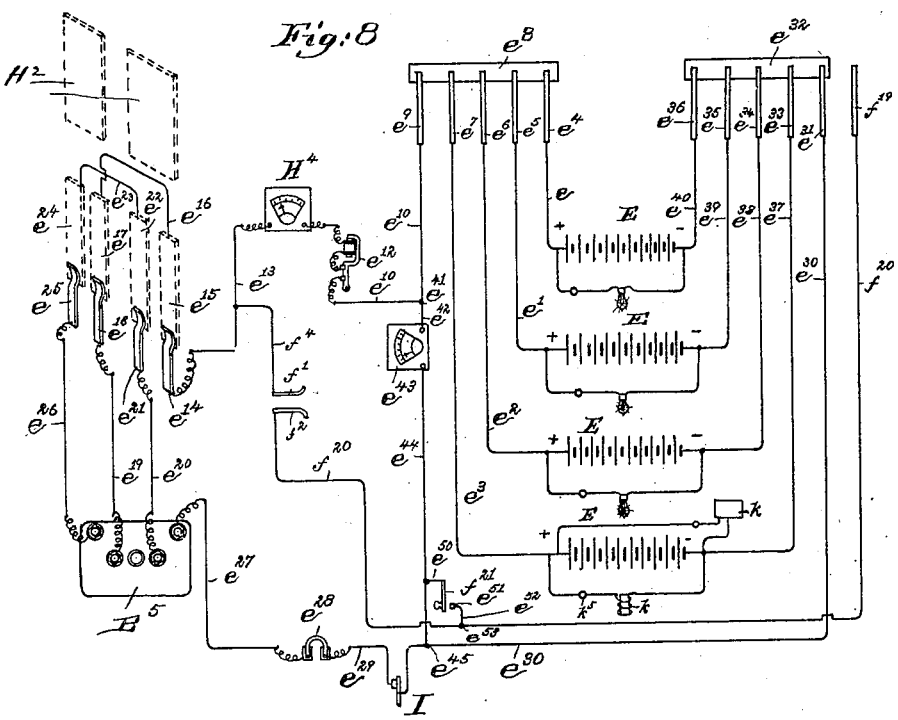
Witnesses,
Paul Askenasy
Edward W. Stone
Inventor,
Howard F. Eaton.

No. 659,729. Patented Oct. 16, 1900.
H. F. EATON.
CONTROL APPARATUS FOR ELECTRIC CARRIAGES.
(Application filed Mar. 25, 1899.)
(No Model.) 5 Sheets—Sheet 5.
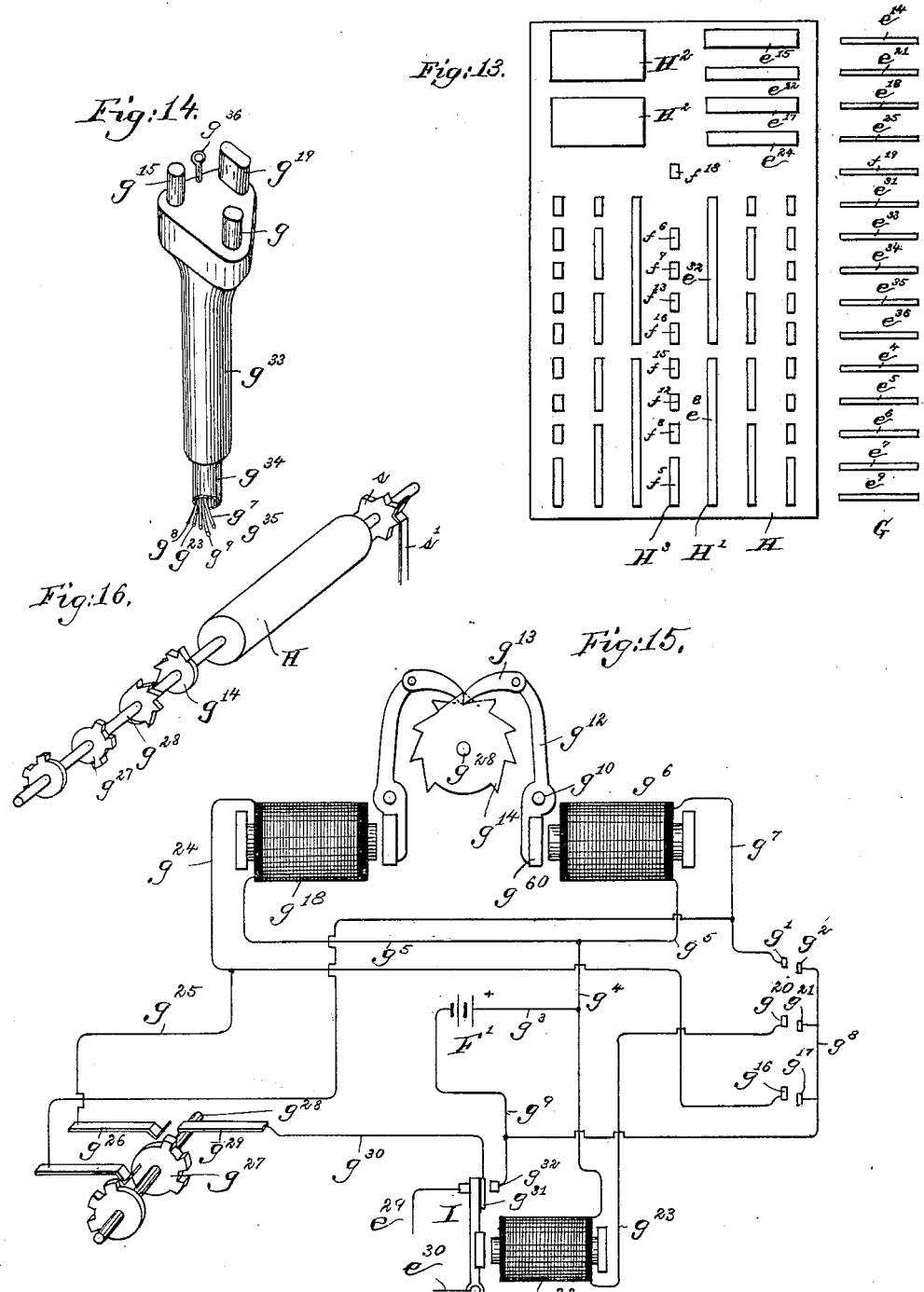

UNITED STATES PATENT OFFICE.

HOWARD F. EATON, OF QUINCY, MASSACHUSETTS.

CONTROL APPARATUS FOR ELECTRIC CARRIAGES.

SPECIFICATION forming part of Letters Patent No. 659,729, dated October 16, 1900.

Application filed March 25, 1899. Serial No. 710,450. (No model.)

*To all whom it may concern:*

Be it known that I, HOWARD F. EATON, of Quincy, county of Norfolk, State of Massachusetts, have invented an Improvement in Electric Motor-Carriages and the Like, of which the following description, in connection with the accompanying drawings, is a specification, like letters representing like parts.

This invention has for its object the improvement of electric motor-carriages in that the batteries are suspended on the running-gear independent of the carriage-body, to insure ease in riding and obviate top-heaviness, the connection of the electric motor to the driving-wheels independent of a differential gear, also the control of the different speeds of the motor, and the heating of the steering-lever handle.

The above, with other features of my invention, will be more fully pointed out in the specification and the accompanying drawings and claims.

Figure 1:
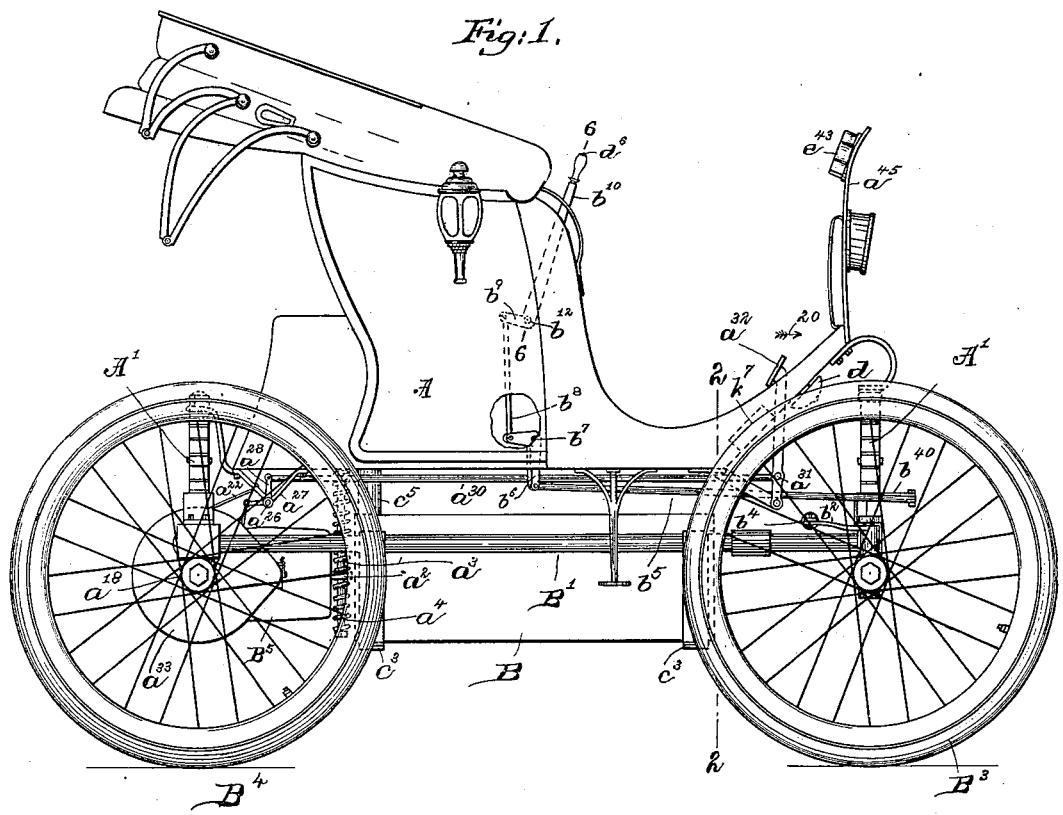
Figure 2:
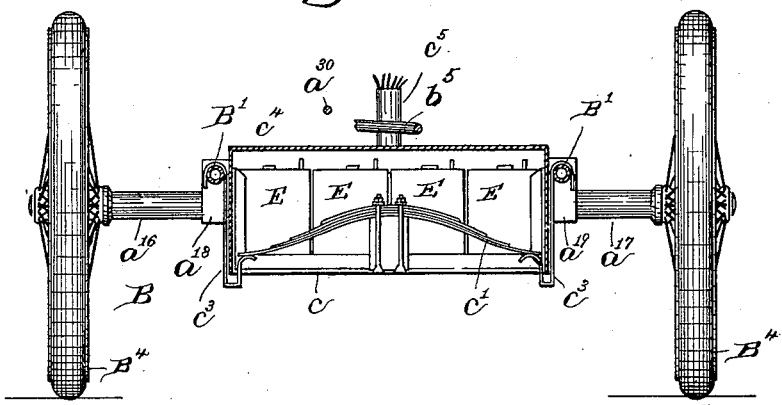

In the drawings, Figure 1 is a side elevation of the carriage with the top down. Fig. 2 is a section on line 2 2 looking to the left with the carriage-body removed. Fig. 3 is a top or plan view of the carriage with the body removed, showing the running-gear in full. Fig. 4 is an enlarged side elevation showing the motor and its suspension on the rear axle and also its flexible support on the carriage-body. Fig. 5 is a section on the line 5 5, Fig. 4, showing the armatures and the engaging gears on the rear axle. Fig. 6 is a section of the steering-lever on line 6 6, as shown in Fig. 1, and showing circuits of alarm-bell and handle-heater. Fig. 7 is a plan view of the foot-heater. Figs. 8, 9, 10, and 11 are diagram views of the motor and battery circuits. Fig. 12 is a diagram of the circuits of the double armatures of the motor. Fig. 13 is a diagram view of the drum, showing the segment-contacts for giving the desired combination of the batteries for the required speeds of the carriage. Fig. 14 is a perspective view of the push-buttons for operating the magnets that control the drum. Fig. 15 is a diagram view of the circuits that control the drum. Fig. 16 is a perspective view of the drum with its shaft and ratchet-wheels.

Referring to the drawings as in Fig. 1, the carriage-body A is shown as supported on the running-gear B, as by springs and hangers A'. The running-gear is made up of tubing B' as a framework for supporting the different parts, and at the points $B^2$ $B^2$ are loose joints to allow the framework to give when the wheels $B^3$ and $B^4$ are passing over an uneven surface or road-bed.

The electric motor $B^5$ is secured by clamps $a$ to the rear axle $a'$ and suspended by a lug or projection $a^2$, secured to or forming part of the field-magnets, the said lug being held in position by springs $a^3$ $a^4$ and hanger-rod $a^5$, secured to the under side of the carriage-body A, this means of suspension being used to relieve the sudden starting or stopping of the carriage. The motor B has the usual form of field-magnets $a^6$; but instead of the usual single armature as ordinarily used I employ a pair of armatures, as C and D, with their corresponding brushes and holders $a^7$ and $a^8$.

The shafts $a^9$ and $a^{10}$ have at their outer extremities pinions $a^{12}$ and $a^{13}$, meshing with gears $a^{14}$ and $a^{15}$ at one end of sleeves $a^{16}$ and $a^{17}$, and at the outer ends of said sleeves $a^{16}$ and $a^{17}$ are secured the driving-wheels $B^4$. This construction allows of the wheels $B^4$ to vary in speed, which is necessary in turning the carriage. The sleeves $a^{16}$ and $a^{17}$ are journaled in bearings $a^{18}$ and $a^{19}$, forming part of the frame B.

To stop the carriage, a double band or hub brake is employed, and, as shown, the gear-wheels $a^{14}$ and $a^{15}$ are provided with hubs $a^{20}$ and $a^{21}$, encircling which are two flexible steel bands $a^{22}$ and $a^{23}$ and lined with leather to secure additional friction. The ends of the bands $a^{22}$ and $a^{23}$ are pivotally secured, as at $a^{24}$, to rocker-arms $a^{25}$, secured to a rocker-shaft $a^{26}$, supported in bearings $a^{27}$, fastened to the under side of the carriage-body A. On the rocker-shaft $a^{26}$ is secured an arm $a^{28}$, pivotally connected at its outer extremity $a^{29}$ with a connecting-rod $a^{30}$, which connects at its opposite end $a^{31}$ with a foot-lever $a^{32}$, carried up and through the bottom of the carriage-body within reach of the foot of the operator. The pressure of the foot-lever in the direction of the arrow 20 through the connecting-rod $a^{30}$ causes the rocker-shaft $a^{26}$ to turn sufficiently to cause the bands $a^{22}$ and $a^{23}$ to clamp on the hubs $a^{20}$ and $a^{21}$ the desired amount to stop the carriage.

To protect the gears from dust and obstruction, a guard $a^{33}$ is provided for each gear and pinion.

The axles of the steering-wheels $B^3$ are pivoted, as at $b$ and at $b'$. The axles have secured to or forming part of them arms or projections $b^2$ and $b^3$, which are pivotally connected by a connecting-rod $b^4$, so that one wheel will not move without a corresponding movement of the other. As shown in Fig. 3, the arms $b^2$ and $b^3$ are set at an angle in relation to the wheels, so that the axles of the wheels $B^3$ will assume a substantially-correct relation with the rear axle to form an imaginary pivot-point for the turning of the carriage. On the axle having the arm or projection $b^3$ is an arm or projection $b^{10}$, secured to or forming a part thereof, and at the outer end is pivotally connected a rod $b^5$, which is connected at its opposite end with the bell-crank lever $b^6$, pivoted at a point $b^7$ on the carriage-body. The opposite arm of the bell-crank lever $b^6$ is pivotally connected by a rod $b^8$ with an arm $b^9$, (shown in dotted lines, Fig. 1,) forming a part of the steering-lever $b^{10}$, pivoted as at $b^{12}$.

The batteries E for supplying the current to drive the carriage are placed in a tray or framework of angle-iron $c$, supported on springs $c'$ and $c^2$, the springs resting on hangers $c^3$, made hooked-shaped and resting on the framework B'. The springs $c'$ and $c^2$ are placed close to the framework or tray $c$ to allow the springs and batteries to be covered by a suitable box $c^4$ to protect them from mud and moisture. The supporting of the batteries on springs is to eliminate the vibration and lengthen the life of the batteries. Secured to the box $c^4$ is a thin tube $c^5$, extending up and through the bottom of the carriage-body A and through which the battery and motor wires are carried. The various speeds of the motor for driving the carriage is accomplished by grouping the batteries E into the different combinations, so as to change the voltage— namely: a first speed using a voltage of twenty volts with the four sets of batteries in multiple, as shown in Fig. 8; second, a voltage of forty volts, two sets each in multiple, and then they are connected in series, as shown in Fig. 9, and, third, a voltage of eighty volts, the cells all in series, as shown in Fig. 10. These various combinations of the batteries are made by the terminals of the batteries E being connected by wires F to brushes G, in contact with an insulated drum H, on which are metallic segments H' for making the desired combinations.

To reverse the motor and move the carriage in a reverse direction, the drum H is electromechanically revolved in an opposite direction, which through the contacts $H^2$ and contact-springs $e^{15}$ $e^{17}$ $e^{22}$ $e^{24}$, as shown in Fig. 8, causes the current through the armature of the motor to be reversed.

To more clearly understand the various circuits for controlling the speed, we will trace the current as in Fig. 8, which is the first speed forward. Starting with the positive of the batteries E, as shown in Fig. 8, it will be seen that the current will be brought by the four wires $e$ $e'$ $e^2$ $e^3$ to the brushes $e^4$ $e^5$ $e^6$ $e^7$, to the segment $e^8$, then to brush $e^9$, wire $e^{10}$, through automatic circuit-opener $e^{12}$, which automatically opens in case of an overload on the motor, thence through ammeter $H^4$, wire $e^{13}$, through the brush $e^{14}$, segment $e^{15}$, wire $e^{16}$, segment $e^{17}$, brush $e^{18}$, wire $e^{19}$, both sets of brushes $a^7$ and $a^8$ and armatures C and D, as shown in detail in Fig. 12, thence by wire $e^{20}$, brush $e^{21}$, segment $e^{22}$, wire $e^{23}$, segment $e^{24}$, brush $e^{25}$, wire $e^{26}$, field-magnets of the motor $B^5$, wire $e^{27}$, safety-key $e^{28}$, wire $e^{29}$, circuit-opener I, wire $e^{30}$, brush $e^{31}$, segment $e^{32}$, brushes $e^{33}$ $e^{34}$ $e^{35}$ $e^{36}$, and thence through the wires $e^{37}$ $e^{38}$ $e^{39}$ $e^{40}$ to the negative poles of the four batteries E. On the wire $e^{10}$ at the point $e^{41}$ connects a wire $e^{42}$ with a volt-meter $e^{43}$, thence through a wire $e^{44}$ to a point $e^{45}$ on the wire $e^{30}$, thus showing on the volt-meter $e^{43}$ the voltage of the circuit, which is in the same case with the ammeter and secured to the dasher $a^{45}$. The description of the circuits of the above shows the arrangement for the first speed, and for the second and third the same path is traveled, except that the grouping of the batteries is arranged as shown in Figs. 9 and 10, respectively.

To charge the batteries, as shown in Fig. 11, the drum is placed at a point, as at $H^3$, Fig. 13, and a plug $f$ is inserted in the terminals $f'$ and $f^2$, and the said plug being connected with a suitable dynamo by wires $f^3$. To charge the batteries, we will suppose that the current will start from the brush $f'$, thence by wires $f^4$ $e^{13}$, ammeter $H^4$, automatic circuit-opener $e^{12}$, wire $e^{10}$, brush $e^9$, segment $f^5$, brush $e^7$, wire $e^3$, battery E, wire $e^{37}$, brush $e^{33}$, segment $f^6$, wire $f^7$, segment $f^8$, brush $e^6$, wire $e^2$, battery E, wire $e^{38}$, brush $e^{34}$, segment $e^9$, wire $f^{10}$, segment $f^{12}$, brush $e^5$, wire $e'$, battery E, wire $e^{39}$, brush $e^{35}$, segment $f^{13}$, wire $f^{14}$, segment $f^{15}$, brush $e^4$, wire $e$, battery E, wire $e^{40}$, brush $e^{36}$, segment $f^{16}$, wire $f^{17}$, segment $f^{18}$, brush $f^{19}$, wire $f^{20}$ to brush $f^2$, and thence through the plug to the dynamo, thus charging the whole set of batteries in series. To test the voltage during the charging, key $f^{21}$ is placed under the seat, and by closing the same a circuit is established from a point $e^{41}$, wire $e^{42}$, volt-meter $e^{43}$, wire $e^{44}$, $e^{50}$, key $f^{21}$, contact $e^{51}$, and wire $e^{52}$ to the point $e^{53}$.

So far in the description of the circuits I have described the different combinations of the batteries for varying the speed of the carriage. Now to revolve this drum that has on its surface the segments for making the different combinations I employ a new and novel arrangement. We will start with the drum at the position $H^3$, and, first inserting the safety-key $e^{28}$, will then depress the key $g$, closing the contact $g'$ $g^2$, and in so doing a circuit will be established as follows: beginning from the positive pole of the battery F' and wire $g^3$ $g^4$ $g^5$, magnet $g^6$, wire $g^7$, contacts $g'$ $g^2$, and wires $g^8$ $g^9$ to the negative pole of the battery F', thus energizing the magnet $g^6$ and attracting its armature $g^{60}$ and revolving the drum H through the movement of the lever $g^{12}$, pivoted at $g^{10}$, and its pawl $g^{13}$, engaging with a ratchet-wheel $g^{14}$, thereby giving a combination of circuits resulting in the first speed. A second contact energizes the magnet a second time, thus changing to the second speed, and a third contact a still further movement and a third or full speed. To slow up gradually, a depression of the key $g^{15}$ will, through the contacts $g^{16}$ $g^{17}$, energize the magnets $g^{18}$, and thus revolve the drum H in the opposite direction, and thus bring the drum to the position $H^3$ and slow up the speed of the carriage to a stop; but in case it is desired to stop suddenly a depression of the key $g^{19}$ will close the contracts $g^{20}$ $g^{21}$, thus creating a circuit as follows: from the positive pole of the battery F', wires $g^3$ $g^4$, magnet $g^{22}$, wire $g^{23}$, contacts $g^{20}$ $g^{21}$, and wires $g^8$ and $g^9$ to battery. In so doing the contact I is open, thereby opening the motor-circuit on whatever speed and stopping the motor. In the meantime a circuit as follows is created: beginning from the positive pole of the battery F', wires $g^3$ $g^5$, through magnet $g^{18}$, wires $g^{24}$ $g^{25}$, brush $g^{26}$, contact-wheel $g^{27}$, shaft $g^{28}$, brush $g^{29}$, wire $g^{30}$, contacts $g^{31}$ $g^{32}$, and wire $g^9$ to negative pole of battery, which is intermittently closed through the contact-wheel $g^{27}$, thus revolving the drum backward to its position $H^3$. To hold the drum H in its different positions, a star-wheel $s$ is secured on the shaft $g^{28}$, and engaging with the said star-wheel is a spring $g'$, that is shaped to coöperate with recesses on the wheel and said recesses corresponding with the different rows of segments for the different speeds of the motor. To move the carriage in the reverse or a backward direction, the operator could utilize the key or contact $g^{15}$, and using the keys $g$ and $g^{19}$ a similar control can be obtained of the carriage as in the forward direction. I have shown these keys or contacts as inclosed in an insulated handle $g^{33}$, that is held in the hand of the operator, and the said handle is connected by a flexible cord $g^{34}$, covering the wires $g^{35}$, and when not in use the handle can be hung up by the eye $g^{36}$ on a suitable hook in the carriage. In using this form of controller, with the steering-lever on the side, the seat is left free from all projections or obstructions.

As an extra safeguard against accident or derangement of the circuits a key $e^{28}$ is located at the side of the operator, so that it may be withdrawn instantly, or in case he wishes to leave the carriage and guard against any one using it he can withdraw the key and take it away with him. An alarm-bell $d$ is provided and connected by wires $d'$ to a battery $d^2$ and brushes $d^3$, corresponding with segments $d^4$, connected by wires $d^5$ with a push-button $d^6$, placed in the handle of the steering-lever $b^{12}$, so that at all times the operator has for instant use a suitable alarm.

On the steering-lever $b^{12}$ I have wound a coil of resistant-wire $k$, connected by wires $k'$ to segments $k^2$, on which rest bushes $k^3$, connected by wire $k^4$ to a switch $k^5$ and battery E. When switch $k^5$ is turned on, a small amount of current flows through the coil on the handle and warms the same sufficiently to keep the hand of the operator warm.

The feet of the occupants may be kept warm by a heater $k^6$, made in the usual form and placed in the bottom of the carriage, as at $k^7$. (Shown in dotted lines in Fig. 1.)

To throw sufficient light on the road at night, a headlight and side lights are provided.

In the construction of my carriage whereas the motor and battery-box are supported on the framework independent of the carriage-body it is obvious that the same running-gear may be used with different styles of body, such as a two-seated body, a light delivery-wagon, &c.

It is obvious from supporting the batteries below the carriage-body that it allows the use of the space under the seat for carrying packages, &c.

I claim—

1. The combination in an electrically-propelled vehicle, of a body, its running-gear, batteries and motor driving mechanism, with the electromechanically - operated motor speed-controlling drum and contact-keys for controlling the drum-operating circuits substantially as described.

2. In a motor-carriage of the class described the combination with the single-field, double-armature-motor driving mechanism, its batteries and supporting-frame, of the electromechanically-operated motor speed-controlling drum and contact-keys for controlling the drum-operating circuits substantially as and for the purpose described.

3. In a motor-carriage of the class described the combination with the single-field, double-armature-motor driving mechanism, its battery and supporting - frame, of the electromechanically-operated motor speed-controlling drum and contact-keys supported in a handle and connected by wires inclosed in a flexible cord for controlling the drum-operating circuits substantially as and for the purpose described.

4. In a motor-carriage of the class described, the combination with the motor driving mechanism and its battery E, of the electromechanically-operated motor speed-controlling drum and contact-keys for controlling the drum-operating circuits, substantially as and for the purpose described.

5. In a motor-carriage of the class described, the combination with the single-field, double-armature-motor driving mechanism, its battery and supporting - frame, of the electromechanically-actuated motor speed-controller, and contact-keys for controlling the motor speed-controller-operating circuits, substantially as and for the purpose described.

6. In a motor-carriage of the class described, the combination with the motor driving mechanism and its battery E, of the electromechanically-actuated motor speed-controller, and contact-keys for controlling the motor speed-controller-operating circuits, substantially as and for the purpose described.

HOWARD F. EATON.

Witnesses:
HERMAN ASKENASY,
PAUL ASKENASY.